(12) United States Patent
Yamauchi et al.

(10) Patent No.: US 11,045,379 B2
(45) Date of Patent: Jun. 29, 2021

(54) SEAT

(71) Applicant: TOYOTA BOSHOKU KABUSHIKI KAISHA, Aichi-ken (JP)

(72) Inventors: Katsuhito Yamauchi, Aichi-ken (JP); Nobuki Hayashi, Aichi-ken (JP); Tokuyuki Nishikawa, Aichi-ken (JP); Takeshi Yamada, Aichi-ken (JP)

(73) Assignee: TOYOTA BOSHOKU KABUSHIKI KAISHA, Aichi-ken (JP)

(*) Notice: Subject to any disclaimer, the term of this patent is extended or adjusted under 35 U.S.C. 154(b) by 281 days.

(21) Appl. No.: 16/416,845

(22) Filed: May 20, 2019

(65) Prior Publication Data
US 2019/0358111 A1 Nov. 28, 2019

(30) Foreign Application Priority Data

May 23, 2018 (JP) .............................. JP2018-098609

(51) Int. Cl.
*A61H 1/00* (2006.01)
*A47C 3/18* (2006.01)
(Continued)

(52) U.S. Cl.
CPC .............. *A61H 1/005* (2013.01); *A47C 3/18* (2013.01); *A47C 7/727* (2018.08); *A61H 23/0218* (2013.01); *A61H 2201/0149* (2013.01); *A61H 2201/0192* (2013.01); *A61H 2203/0431* (2013.01)

(58) Field of Classification Search
CPC ................ A61H 1/005; A61H 23/0218; A61H 2203/0431; A61H 2201/0192; A61H 2201/0149; A47C 1/00; A47C 1/032; A47C 1/024; A47C 1/0242; A47C 1/028; A47C 7/006; A47C 7/727; A47C 7/002; B60N 2/90; B60N 2/933; B60N 2/976; B60N 2/0224; B60N 2/0228; B60N 2/0232; B60N 2002/0204; B60N 2002/0216;
(Continued)

(56) References Cited

U.S. PATENT DOCUMENTS

2015/0282623 A1* 10/2015 Reddig .................... A47C 7/56
297/331
2016/0278530 A1* 9/2016 Kim .......................... A63J 5/00

FOREIGN PATENT DOCUMENTS

JP 2012-116218 6/2012

* cited by examiner

*Primary Examiner* — Rachel T Sippel
*Assistant Examiner* — Kelsey E Baller
(74) *Attorney, Agent, or Firm* — Greenblum & Bernstein, P.L.C.

(57) ABSTRACT

A seat including: a seat surface portion having first and second support surfaces; and a switching mechanism, wherein the seat surface portion is switched by the switching mechanism between: a first posture in which the seat surface portion is brought down to the front side such that the first support surface is in a low position where a seated person is capable of sitting thereon by lowering a hip, and a second posture in which the seat surface portion is brought up to the rear side from the first posture such that the second support surface is in a high position where the seated person in a standing posture is capable of sitting thereon, and wherein a vibration device which is configured to apply vibration corresponding to music to a body of the seated person is disposed at an inner side of the second support surface.

3 Claims, 8 Drawing Sheets

(51) Int. Cl.
 *A47C 7/72* (2006.01)
 *A61H 23/02* (2006.01)
(58) Field of Classification Search
 CPC .... B60N 2002/0256; B60N 2002/0268; B60N 2002/0272; B61D 33/0007; B64D 11/0611
 See application file for complete search history.

SEAT

CROSS-REFERENCE TO RELATED APPLICATIONS

This application claims priority from Japanese Patent Application No. 2018-098609 filed on May 23, 2018, the entire contents of which are incorporated herein by reference.

TECHNICAL FIELD

The present disclosure relates to a seat. Specifically, the present disclosure relates to a seat in which a seated person is capable of being seated in a standing posture.

BACKGROUND ART

In the related art, as a seat provided for a vehicle such as an industrial vehicle, there is known a standing type seat in which a seated person can be seated in a standing posture (JP-A-2012-116218). The seat has a configuration in which a seat surface portion for supporting buttocks of the seated person is inclined downward to a front side. With the above configuration, the seated person can be seated on the seat surface portion in a state in which an angle of the pelvis is close to an angle in the standing posture, so that a raised sitting posture in which fatigue feeling is less can be obtained.

In the related art described above, the seat surface portion cannot be switched to enable the seated person to lower the hip to sit, and can be used only in the raised sitting posture. Further, when used in the raised sitting posture, there is a problem that a mood of the seated person is not enhanced due to lack of entertainment.

SUMMARY

The present disclosure provides a vehicle seat device in which a seat surface portion is appropriately switched between a state corresponding to a raised sitting posture and a state corresponding to a sitting posture, and a mood of a seated person is enhanced when the seat surface portion is used in the raised sitting posture.

According to an aspect of the present disclosure, there is provided a seat including: a seat surface portion to be seated by a seated person and having a first support surface and a second support surface; and a switching mechanism by which the seat surface portion is configured to be brought down to a front side or brought up to a rear side by rotating rotation respect to a floor, wherein the seat surface portion is configured to be switched by the switching mechanism between: a first posture in which the seat surface portion is brought down to the front side such that the first support surface facing an upper side is in a low position where the seated person is capable of sitting thereon by lowering a hip and the second support surface facing the front side forms a lead-in surface which is led downward on the rear side, and a second posture in which the seat surface portion is brought up to the rear side from the first posture such that the second support surface is pulled up to a position higher than a position of the first support surface in the first posture, an upper surface of the second support surface is inclined downward to the front side due to the lead-in surface, and the second support surface is in a high position where the seated person in a standing posture is capable of sitting thereon, and wherein a vibration device which is configured to apply vibration corresponding to music to a body of the seated person is disposed at an inner side of the second support surface.

Accordingly, when the seated person is seated on the second support surface in the standing posture when the seat surface portion is in the second posture, the vibration corresponding to the music can be applied to the body of the seated person by the vibration device disposed at the inner side of the second support surface. Accordingly, the mood of the seated person can be enhanced.

DETAILED DESCRIPTION

Figure 1:
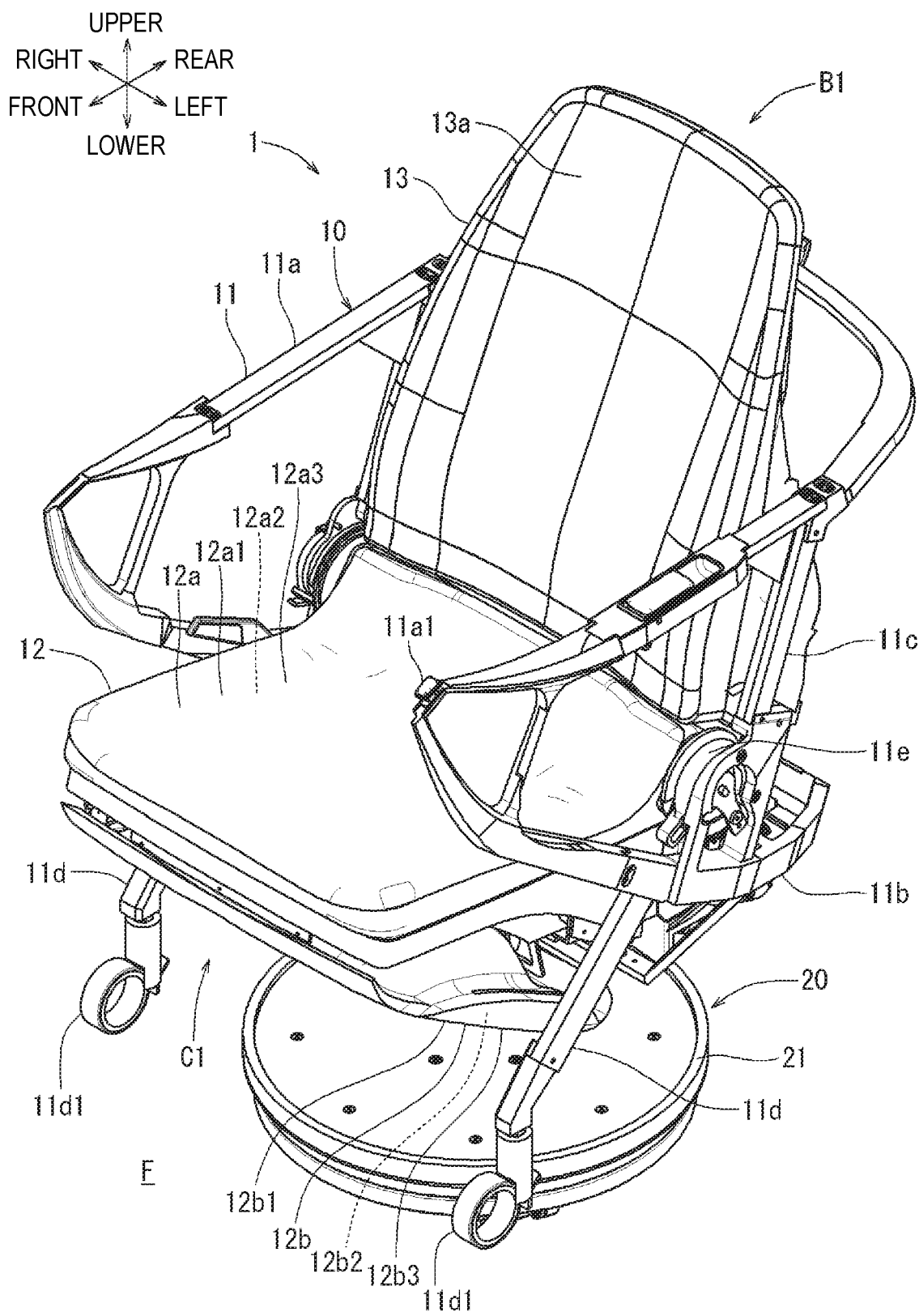
FIG. 1 is a perspective view of an automobile seat according to an embodiment of the present disclosure.

A configuration of an automobile seat 1 according to an embodiment of the present disclosure will be described with reference to FIGS. 1 to 6. In the following description, directions such as front, rear, upper, lower, left, and right refer to respective directions shown in the drawings.

Figure 2:
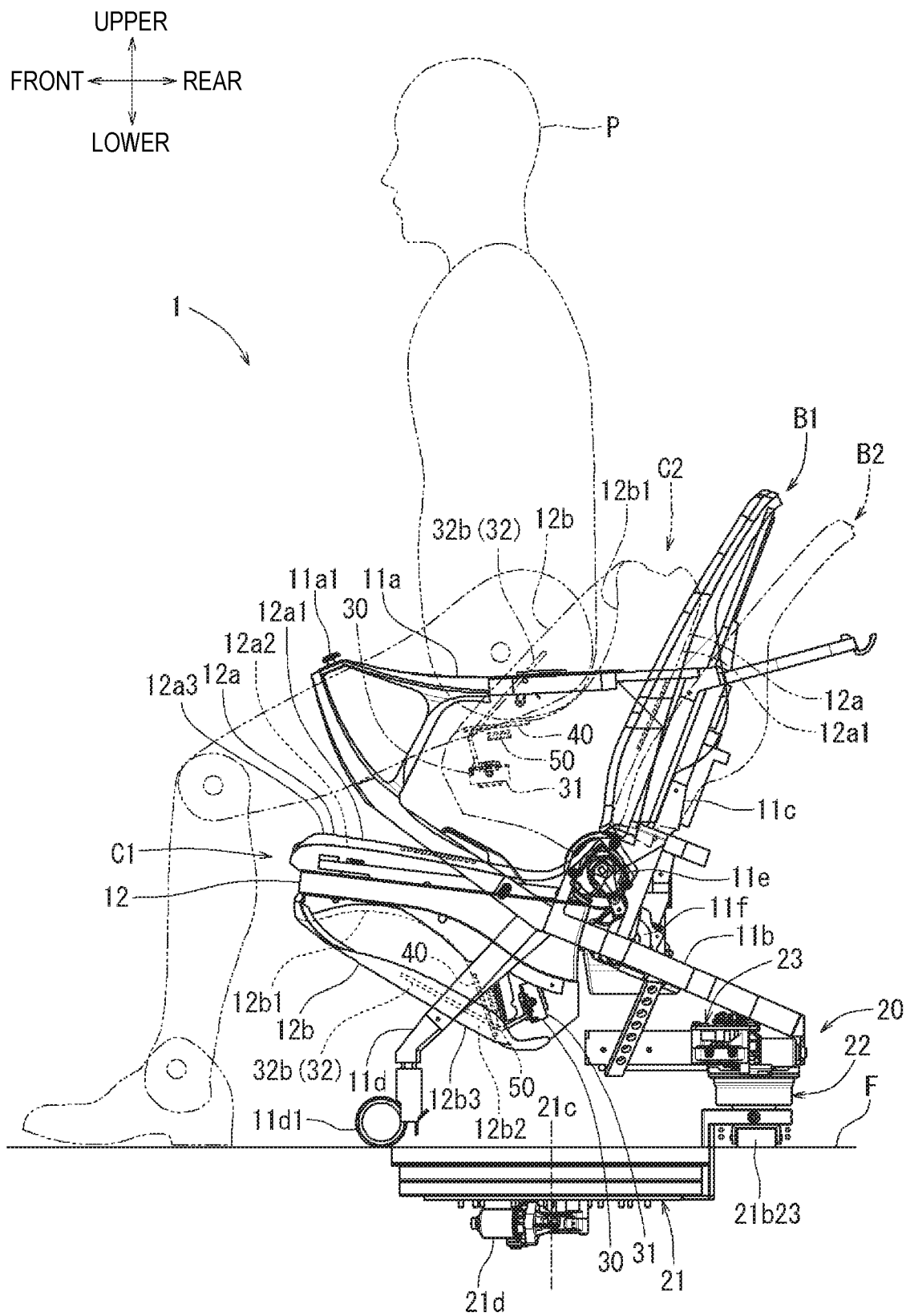
FIG. 2 is a side view of the automobile seat in the above embodiment.

As shown in FIGS. 1 and 2, the automobile seat 1 includes a seat body 10 and a movable mechanism 20 that attaches the seat body 10 to the floor F so as to be movable with respect to the floor F. Here, the automobile seat 1 corresponds to the "seat" in claims.

The seat body 10 includes a frame 11 forming a framework, a seat cushion 12 supported by the frame 11 and serving as a seating surface, and a seat back 13 supported by the frame 11 and serving as a backrest of a seated person. Here, the seat cushion 12 corresponds to the "seat surface portion" in claims.

As shown in FIGS. 1 and 2, the frame 11 is formed by assembling an angular pipe material having a rectangular cross section as a main body. The frame 11 includes an upper frame portion 11a which is formed in a substantially U-shape having an opening on a front side in a top view and extends substantially horizontally, a lower frame portion 11b which is formed in a substantially U-shape having an opening on the front side in the top view and extends obliquely rearward and downward by connecting its opening end to the opening end of the upper frame portion 11a, a pair of left and right connecting portions 11c which connect the upper frame portion 11a and the lower frame portion 11b in a substantially upper-lower direction slightly behind a center portion in a front-rear direction, and a pair of left and right front leg portions 11d which extend obliquely forward and downward from a central portion in the front-rear direction of the lower frame portion 11b. A first recliner 11e which adjusts a flip-up angle of the seat cushion 12 in a position above the lower frame portion 11b and a second recliner 11f which adjusts an inclination angle of the seat back 13 to a same height position as the lower frame portion 11b are disposed in a lower position of each connecting portion 11c. Here, the first recliner 11e corresponds to the "switching mechanism" in claims.

The first recliner 11e and the second recliner 11f are of the electric type and are configured to start rotating when an operation button (not shown) disposed on the frame 11 is pressed, and stop rotating so as to be set in a locked state when a limit switch (to be described below) is pressed. A universal caster 11d1 is attached to a lower tip end portion of each front leg portion 11d. The caster 11d1 is rotated in contact with the floor F to change a position of the front leg portion 11d in a horizontal direction. Although not shown in FIGS. 1 and 2, the frame 11 is covered with a cover member made of resin and has a good appearance.

As shown in FIGS. 1 and 2, the seat cushion 12 is formed in a substantially V-shape in a side view. Specifically, in a sitting posture position C1 shown by a solid line in FIGS. 1 and 2, the seat cushion 12 includes a first support surface portion 12a which faces an upper side and a second support surface portion 12b which faces a front lower side. When the seat cushion 12 is in the sitting posture position C1, a first support surface 12a1 which is an upper surface of the first support surface portion 12a is formed as a substantially flat surface, and a second support surface 12b1 which is a front lower surface of the second support surface portion 12b is formed as a concave surface whose central portion is concaved in a rear upper direction. A seated person P can lower the hips thereof to be seated in the sitting posture on the first support surface 12a1 of the seat cushion 12 in the sitting posture position C1. Further, the second support surface 12b1 forms a lead-in surface which is led downward on a rear side, and when the seated person P is seated on the first support surface 12a1, a space which allows a lower leg portion thereof to be led toward a rear side is formed. The seat cushion 12 is formed by placing cushion pads 12a2, 12b2, which are cushion materials, on a cushion frame (not shown) forming a framework, and covering the cushion pads 12a2, 12b2 by cushion covers 12a3, 12b3 which are cover materials. That is, the first support surface 12a1 of the first support surface portion 12a and the second support surface 12b1 of the second support surface portion 12b are formed so as to softly contact and support the body of the seated person P. When the seat cushion 12 is in the sitting posture position C1, a rear end portion side of the cushion frame is attached to the connecting portions 11c of the frame 11 via the first recliners 11c.

When the operation button is pressed while the seat cushion 12 is in the sitting posture position C1, the seat cushion 12 rotates clockwise around a rotation shaft of each first recliner 11e in FIG. 2, and a front end side is brought up. When the seat cushion 12 brought up 90 degrees or more backward from the sitting posture position C1 to a raised sitting posture position C2 shown by a two-dot chain line in FIG. 2, the rotation of the first recliners 11e is stopped and the locked state is set by pressing a limit switch 11g (see FIG. 7) disposed on the frame 11 by the seat cushion 12. At this time, the second support surface portion 12b is raised to a position higher than the first support surface portion 12a in the sitting posture position C1, and the second support surface 12b1 is a surface inclined downward to the front side and can contact and support the buttocks of the seated person P. Since the second support surface 12b1 forming the seating surface in the raised sitting posture position C2 forms a surface inclined downward on the front side, the surface widely faces the buttocks of the seated person P in the raised sitting posture, and an edge portion thereof on the front side is unlikely to form an overhanging shape that bites into the buttocks of the seated person P. Therefore, the seated person P seated on the second support surface portion 12b has a good sitting feeling with less foreign body feeling, and can take a raised sitting posture with less fatigue feeling in which an angle of the pelvis is close to an angle in the standing posture. Here, the sitting posture position C1 and the raised sitting posture position C2 correspond to the "first posture" and the "second posture" in claims, respectively.

Figure 5:
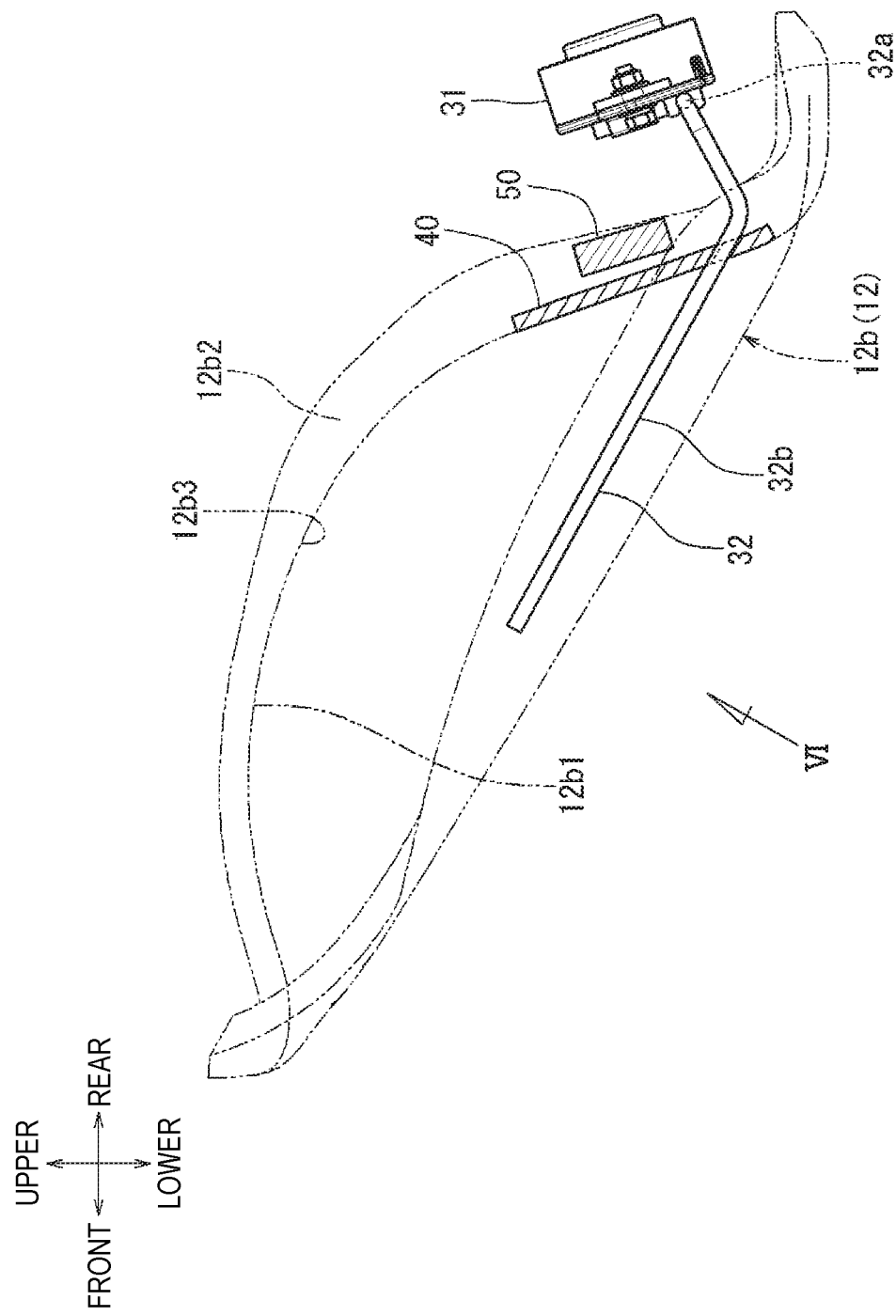
FIG. 5 is a side view showing a state in which a vibration device is disposed in a seat cushion in the above embodiment.
Figure 6:
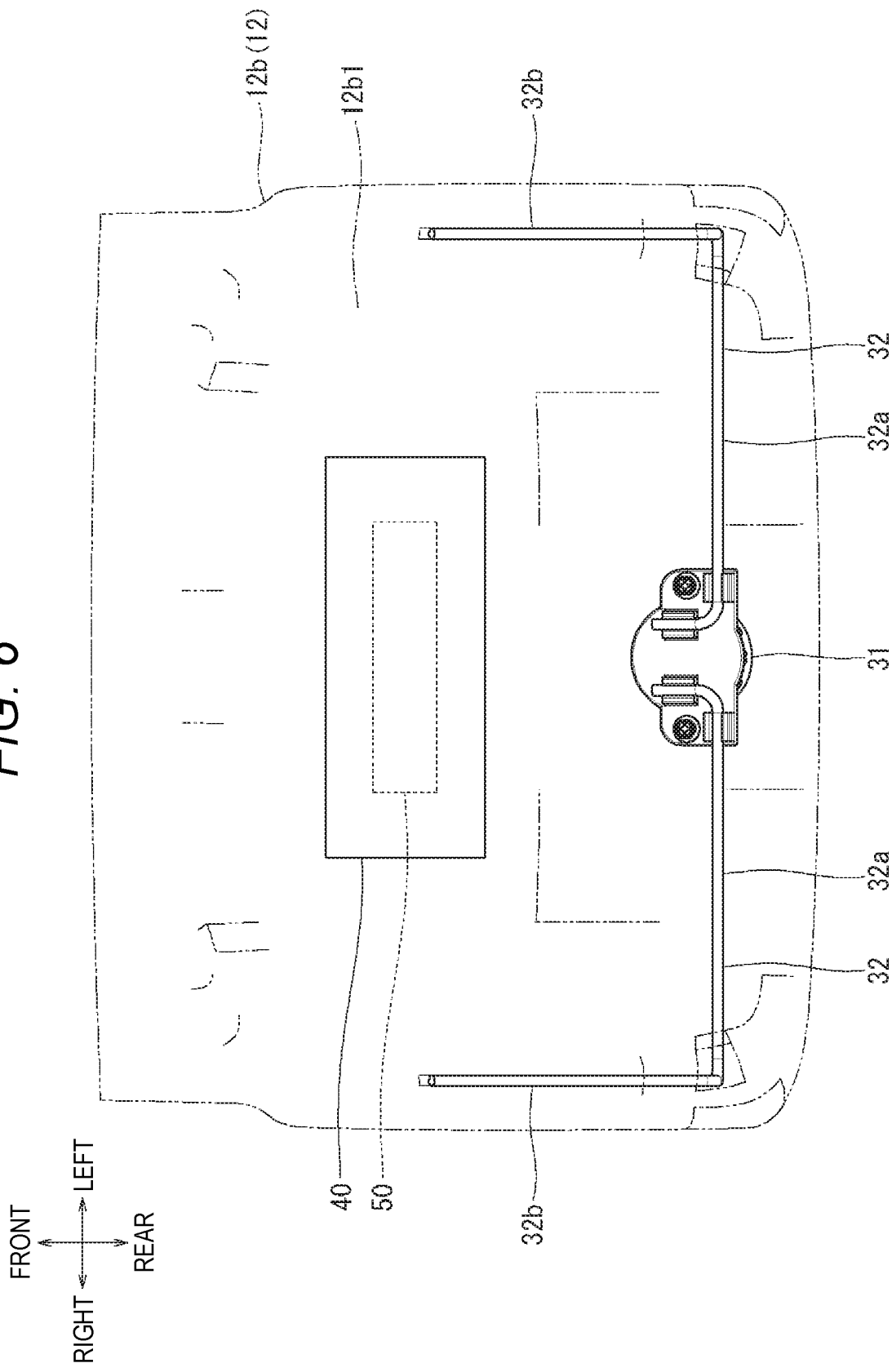
FIG. 6 is a view seen from a direction VI in FIG. 5 showing a state in which the vibration device is disposed in the seat cushion in the above embodiment.

As shown in FIGS. 2, 5, and 6, a vibration device 30, a seating sensor 40, and an acceleration sensor 50 are disposed on the second support surface portion 12b. The vibration device 30 includes a voice coil motor type vibrating body 31 and a pair of left and right rod-shaped bodies 32 having one end side attached to the vibrating body 31. Each rod-shaped body 32 is formed by bending a round bar in an L shape as viewed from a direction perpendicular to the second support surface 12b1, and includes a horizontal bar portion 32a extending in a left-right direction (seat width direction) and a vertical bar portion 32b extending in a front-rear direction from an end portion of the horizontal bar portion 32a on an outer side in the seat width direction. An end portion of each horizontal bar portion 32a on a seat inner side is fixed to the vibrating body 31. Each vertical bar portion 32b is formed by being bent in a substantially L shape as viewed from the left-right direction, and an end portion side opposite to the end portion to which the horizontal bar portion 32a is connected is embedded and attached to an inner side of the second support surface 12b1 of a portion of the cushion pad 12b2 corresponding to a side portion of the thigh of the seated person P. Accordingly, the vibrating body 31 is supported by each horizontal bar portion 32a and arranged to be separated from the cushion pad 12b2. When the seat cushion 12 is in the raised sitting posture position C2 and the seated person P is seated, the seating sensor 40 and the acceleration sensor 50 are embedded and disposed in positions between the respective vertical bar portions 32b corresponding to the pelvis of the seated person P in the cushion pad 12b2. More specifically, the seating sensor 40 has a rectangular shape and is disposed between the cushion cover 12b3 and the cushion pad 12b2. The seating sensor 40 outputs a signal when the seated person P is seated on the second support surface 12b1. The acceleration sensor 50 has a rectangular parallelepiped shape smaller than the seating sensor 40, and is embedded and disposed in the cushion pad 12b2 below the seating sensor 40. The acceleration sensor 50 detects a body motion and outputs a signal when the seated person P moves while sitting on the second support surface 12b1. Here, the cushion pad 12b2 corresponds to the "cushion pad" in claims, and the vertical bar portion 32b corresponds to the "at least a part of the rod-shaped body" in claims.

As shown in FIGS. 1 and 2, the seat back 13 is formed in a substantially I shape in a vertical direction in the side view. Specifically, in a sitting posture position B1 shown by the solid line in FIGS. 1 and 2, a front surface serving as a backrest surface is formed so as to form a substantially flat inclined surface slightly inclined rearward than the vertical direction. The front surface of the seat back 13 in the sitting posture position B1 can support from behind the back portion of the sitting person P seated in the sitting posture with the hips thereof lowered. The seat back 13 is formed by placing a back pad (not shown), which is a cushion material, on a back frame (not shown) forming a framework, and covering the back pad by a back cover which is a cover material. That is, a front surface portion of the seat back 13 is formed so as to softly contact and support the body of the seated person P. A lower end portion side of the back frame of the seat back 13 is attached to the connecting portions 11c of the frame 11 via the second recliners 11f.

When the operation button is pressed in a state in which the seat cushion 12 is in the sitting posture position C1 and the seat back 13 is in the sitting posture position B1, the seat back 13 rotates clockwise around the rotation shaft of the second recliners 11f and tilts backward in FIG. 2. When coming into a raised sitting posture position 32 shown by a two-dot chain line in FIG. 2, the seat back 13 presses a limit switch (not shown) disposed on the frame 11, and thus the second recliners 11f are stopped from rotating and comes into a locked state. At this time, the seat back 13 is in a position without in contact with the seat cushion 12 in the raised sitting posture position C2. The seat back 13 moves from the sitting posture position B1 to the raised sitting posture position B2 in a shorter time than a time required for the seat cushion 12 to reach the raised sitting posture position C2 from the sitting posture position C1. Accordingly, the seat cushion 12 and the seat back 13 do not interfere with each other in a process in which the seat cushion 12 moves from the sitting posture position C1 to the raised sitting posture position C2 and the seat back 13 moves from the sitting posture position B1 to the raised sitting posture position B2. The seat back 13 does not contact the body of the seated person P when the seat back 13 is in the raised sitting posture position B2.

As shown in FIGS. 1 to 4, the movable mechanism 20 includes a first rotation mechanism 21, a second rotation mechanism 22, and a slide mechanism 23.

Figure 3:
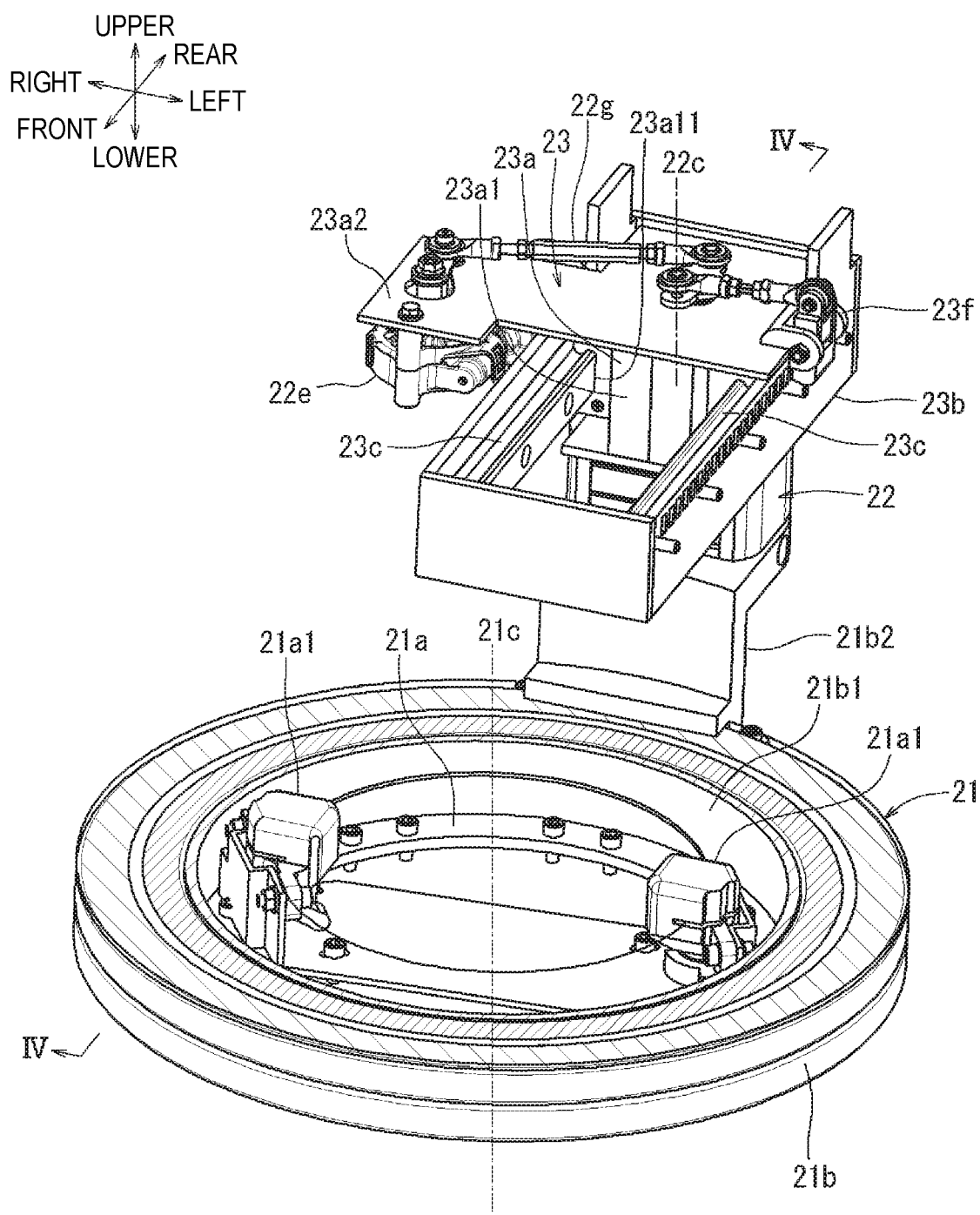
FIG. 3 is a perspective view of a movable mechanism in the above embodiment.
Figure 4:
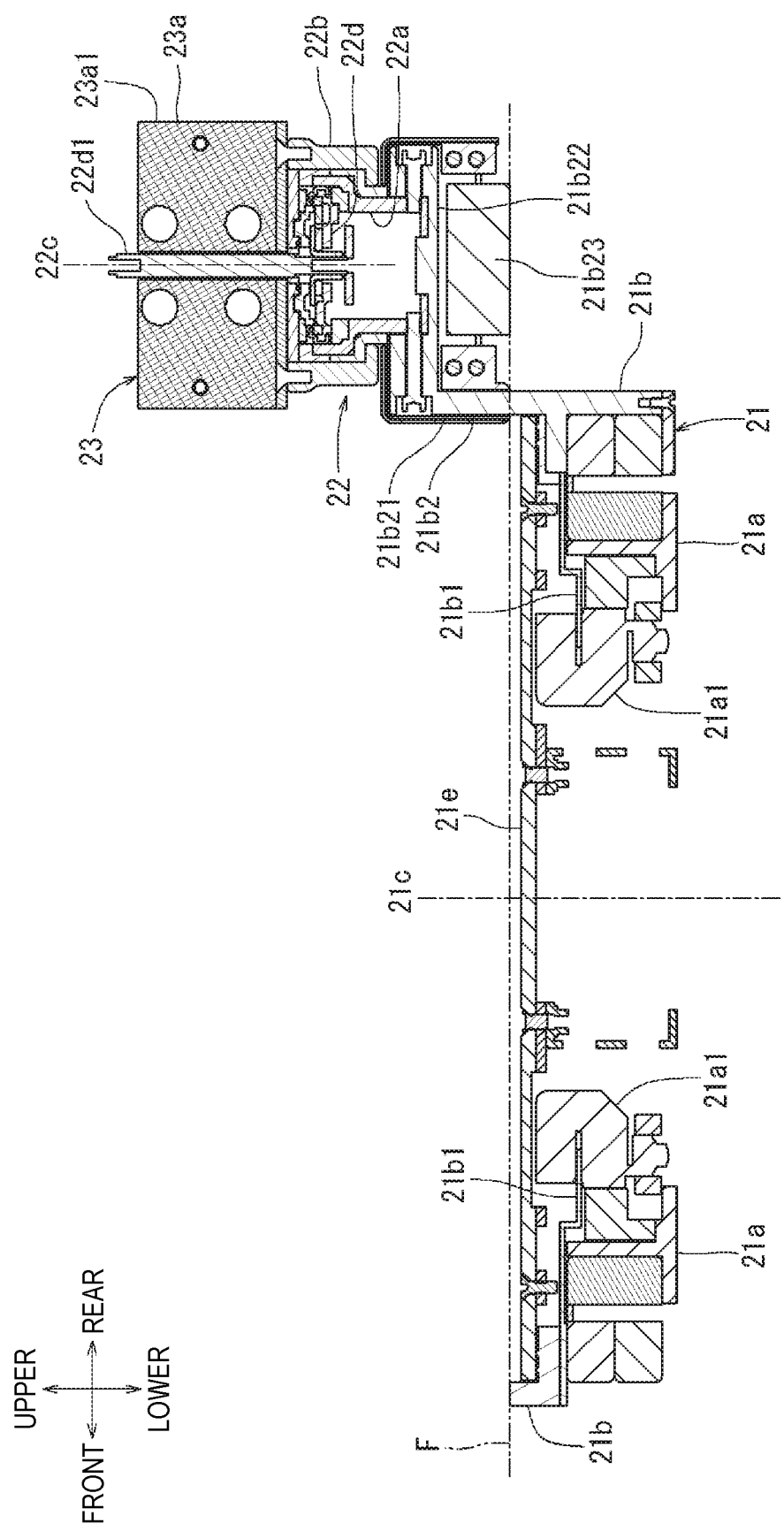
FIG. 4 is a cross sectional view taken along a line IV-IV in FIG. 3.

As shown in FIGS. 2 to 4, the first rotation mechanism 21 includes a fixed ring member 21a fixed to the floor F, and a movable ring member 21b attached to the fixed ring member 21a in a relatively rotatable manner around a rotation shaft 21c via a bearing. The fixed ring member 21a is an annular member taking the rotation shaft 21c perpendicular to the floor F as a central axis, and includes a pair of left and right calipers 21a1. The movable ring member 21b is an annular member taking the rotation shaft 21c as the central axis and is attached to a radially outer side of the fixed ring member 21a in a relatively rotatable manner via a bearing (not shown). On a radially inner side of the movable ring member 21b, a disc 21b1 serving as a rotor is disposed in a position capable of being sandwiched by the calipers 21a1. In a normal state, the calipers 21a1 pinch the disc 21b1, so that the movable ring member 21b cannot relatively rotate with respect to the fixed ring member 21a. When an unlocking switch 11a1 attached to the frame 11 is pressed, the clamping of the disc 21b1 by the calipers 21a1 is canceled by the function of a first motor-driven mechanism 21d (see FIG. 2), and the movable ring member 21b becomes relatively rotatable with respect to the fixed ring member 21a. When the pressing of the lock release switch 11a1 is stopped, the movable ring member 21b returns to an original relatively non-rotatable state. A bracket 21b2 having an L-shaped cross section is disposed on an outer peripheral edge portion of the movable ring member 21b so as to extend substantially in an outer peripheral direction. The bracket 21b2 includes a vertical wall portion 21b21 extending in the upper-lower direction and a lateral wall portion 21b22 extending horizontally and radially outward from an upper end portion of the vertical wall portion 21b21. On a lower side of the lateral wall portion 21b22, a roller 21b23 supported by a rotating shaft extending horizontally in the radial direction is disposed to contact the floor F. The roller 21b23 contributes to transmitting a load applied to the lateral wall portion 21b22 to the floor F. A lid member 21e is disposed on an upper surface of the movable ring member 21b on the radially inner side. The lid member 21e is fixed to the floor F and is slidable on the movable ring member 21b. Since the lid member 21e is disposed, the caster 11d1 of the front leg portion 11d is movable on the first rotation mechanism 21.

As shown in FIGS. 2 to 4, the second rotation mechanism 22 includes a fixed cylindrical member 22a fixed to the lateral wall portion 21b22 of the bracket 21b2 and a movable cylindrical member 22b attached to the fixed cylindrical member 22a in a relatively rotatable manner around a rotation shaft 22c via a bearing. The fixed cylindrical member 22a is a cylindrical member having the rotation shaft 22c perpendicular to the lateral wall portion 21b22 as a central axis, and the movable cylindrical member 22b is a cylindrical member having the rotation shaft 22c as the central axis and is attached to a radially outer side of the fixed cylindrical member 22a in a relatively rotatable manner via a bearing (not shown). A rotation lock mechanism 22d is disposed between the fixed cylindrical member 22a and the movable cylindrical member 22b. The rotation lock mechanism 22d is configured such that the lock is released by rotating the lock release member 22d1 disposed on the central axis in the upper-lower direction by a predetermined angle in a predetermined direction. The central axis of the lock release member 22d1 coincides with the rotation shaft 22c. In the normal state, the movable cylindrical member 22b is not relatively rotatable with respect to the fixed cylindrical member 22a by the rotation lock mechanism 22d. When the lock release switch 11a1 attached to the frame 11 is pressed, the lock release member 22d1 is rotated by a predetermined angle in a predetermined direction by the operation of a second electric mechanism 22e (see FIG. 3), and the movable cylindrical member 22b is relatively rotatable with respect to the fixed cylindrical member 22a. When the pressing of the lock release switch is stopped, the movable ring member returns to the original relatively non-rotatable state.

As shown in FIGS. 2 to 4, the slide mechanism 23 includes a fixed base member 23a fixed to the movable cylindrical member 22b of the second rotation mechanism 22, and a movable frame member 23b slidably attached to the fixed base member 23a in a radial direction of the movable cylindrical member 22b via a slide rail 23c. The fixed base member 23a includes an upright bar portion 23a1 extending upward from an upper surface portion of the movable cylindrical member 22b and a horizontal plate portion 23a2 attached to an upper end portion of the upright bar portion 23a1 and extending in the horizontal direction. A lock release member 22d1 is rotatably passed through a central portion of the upright bar portion 23a1 in the upper-lower direction. The second electric mechanism 22e is attached to a lower surface of one end side of the horizontal plate portion 23a2 in the left-right direction, and a slide lock mechanism 23f is attached to another end side of the horizontal plate portion 23a2 in the left-right direction. The second electric mechanism 22e, the lock release member 22d1, and the slide lock mechanism 23f are connected by a link mechanism 22g. The movable frame member 23b is a member having a rectangular frame shape in the top view and is provided with a pair of slide rails 23c extending in the front-rear direction inside a wall surface extending in the front-rear direction. When the slide rails 23c are slidably assembled to a rail engaging portion 23a11 which corresponds to a cross section of the slide rail 23c and is provided on the upright bar portion 23a1, the movable frame member 23b is slidable in the radial direction of the movable cylindrical member 22b with respect to the fixed base member 23a. In the normal state, the movable frame member 23b is not slidable with respect to the fixed base member 23a by the slide lock mechanism 23f. When the lock release switch 11a1 attached to the frame 11 is pressed, the second electric mechanism 22e (see FIG. 3) is operated to release the lock of the slide lock mechanism 23f via the link mechanism 22g, and the movable frame member 23b is slidable with respect to the fixed base member 23a. When the pressing of the lock release switch 11a1 is stopped, the movable frame member 23b returns to an original non-slidable state. At this time, the lock release member 22d1 is also rotated by a predetermined angle in a predetermined direction via the link mechanism 22g by the operation of the second electric mechanism 22e, and the rotation lock mechanism 22d is also released at the same time.

The operation of the automobile seat 1 will be described. In a normal state, the movable mechanism 20 is in a locked state in a state in which the seat cushion 12 of the seat body 10 is in the sitting posture position C1 and the seat back 13 is in the sitting posture position B1. That is, the first rotation mechanism 21, the second rotation mechanism 22, and the slide mechanism 23 are in the locked state. In this state, when the lock release switch 11a1 is pressed, the first electric mechanism 21d is operated to release the clamping of the disc 21b1 by the calipers 21a1, and the second electric mechanism 22e is operated to release the lock of the rotation lock mechanism 22d and the slide lock mechanism 23f via the link mechanism 22g. Accordingly, the seat body 10 can revolve around the rotation shaft 21c, rotate around the rotation shaft 22c, and slide in a horizontal direction of the movable frame member 23b with respect to the fixed base member 23a, and can be moved to a desired position on the floor F. When the seat body 10 is moved to the desired position, the press of the lock release switch 11a1 is stopped and the original locked state is set. In this state, if necessary, the operation button may be pressed to set the seat cushion 12 of the seat body 10 in the raised sitting posture position C2, and the seat back 13 in the raised sitting posture position B2. When the seat cushion 12 of the seat body 10 is in the raised sitting posture position C2 and the seat back 13 is in the raised sitting posture position B2, it is also possible to move the seat body 10 by switching the movable mechanism 20 into an unlocked state.

Figure 7:
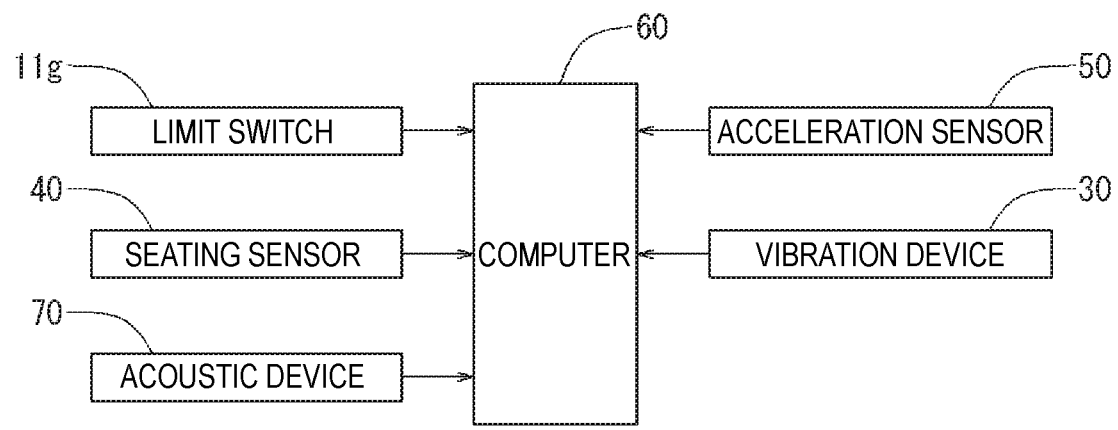
FIG. 7 is a block diagram showing an operation system of the vibration device in the above embodiment.

The operation of the vibration device 30 will be described with reference to FIGS. 7 and 8. FIG. 7 is a block diagram of a case where the operation of the vibration device 30 is implemented by the program control computer 60. The computer 60 is attached to the frame 11, and detection signals from the limit switch 11g of the seat cushion 12, the seating sensor 40 and the acceleration sensor 50 are input. Further, a music signal from an acoustic device 70 such as a car stereo that plays music in a vehicle interior is input to the computer 60. Meanwhile, the vibration device 30 is connected to the computer 60 to make the vibrating body 31 operable.

Figure 8:
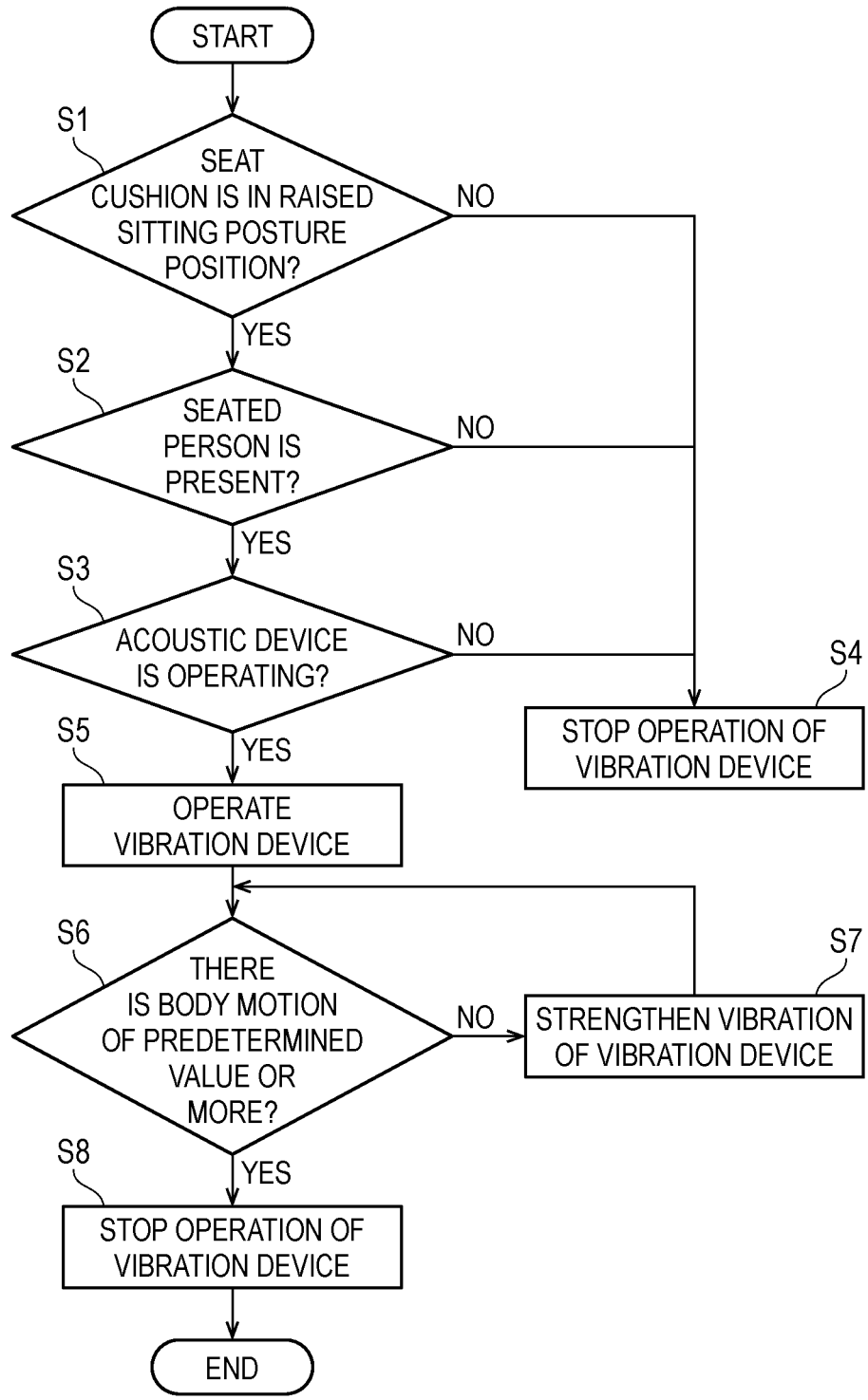
FIG. 8 is a flowchart showing operation of the vibration device in the above embodiment.

FIG. 8 is a flowchart for operating the vibration device 30. In step S1, it is determined whether or not the seat cushion 12 is in the raised sitting posture position C2 based on a detection signal from the limit switch 11g. When the seat cushion 12 is in the raised sitting posture position C2, the process proceeds to step S2, and when the seat cushion 12 is not in the raised sitting posture position C2, the process proceeds to step S4 to stop the operation of the vibration device 30.

In step S1, it is determined whether or not the seated person P is present on the second support surface 12b1 of the seat cushion 12 based on a detection signal from the seating sensor 40. When the seated person P is present on the second support surface 12b1, the process proceeds to step S3, and when the seated person P is not present on the second support surface 12b1, the process proceeds to step S4 to stop the operation of the vibration device 30.

In step S3, it is determined whether or not the acoustic device 70 is operating based on the presence or absence of a signal from the acoustic device 70. If there is a signal from the acoustic device 70, the process proceeds to step S5 to operate the vibration device 30; and if there is no signal from the acoustic device 70, the process proceeds to step S4 to stop the operation of the vibration device 30.

In step S6, it is determined whether or not the seated person P generates a body motion of a predetermined value or larger based on a detection signal from the acceleration sensor 50. When there is a signal of the predetermined value or larger from the acceleration sensor 50, the process proceeds to step S8 to stop the operation of the vibration device 30, and when there is no signal of the predetermined value or larger from the acceleration sensor 50, the process proceeds to step S7, the vibration of the vibration device 30 is slightly strengthened, and the process returns to step S6.

The embodiment configured as described above has the following advantageous effects. When the seated person P is seated on the second support surface 12b1 in the standing posture when the seat cushion 12 in the raised sitting posture position C2, the vibration corresponding to the music can be applied to the body of the seated person P by the vibration device 30 disposed at the inner side of the second support surface 12b1. Accordingly, the mood of the seated person P can be enhanced.

Further, the vibration corresponding to the music can be applied to the body of the seated person P from the vertical bar portion 32b of the rod-shaped body 32 through the cushion pad 12b2. As a result, the vibration corresponding to the music can be applied to the body of the seated person P by simply disposing the vertical bar portion 32b in a position corresponding to the side portion of the thigh where the seated person P does not feel so uncomfortable.

Further, the acceleration sensor 50 is disposed at the inner side the second support surface 12b1, the acceleration sensor 50 detects the body motion of the seated person P when the vibration corresponding to the music is applied to the body of the seated person P by the vibration device 30, and the vibration is strengthened when the body motion is smaller than the predetermined value. Accordingly, the acceleration sensor 50 detects the body motion that is generated when the mood of the seated person P is enhanced due to the vibration corresponding to the music, and when the body motion is equal to or smaller than the predetermined value, the mood can be uplifted by strengthening the vibration.

While the specific embodiment has been described above, the present disclosure is not limited to configurations in the embodiment, and modifications, additions and deletions are possible without changing the spirit of the present disclosure. For example, the following matters are listed.

1. In the above embodiment, a case where the present disclosure is applied to the automobile seat 1 is described, but the present disclosure is not limited thereto, and may be applied to a seat device mounted on a ship, a train, an airplane or the like other than an automobile. Further, the present disclosure can be applied to a seat used in a stadium, a theater, or the like.

2. In the above embodiment, the acoustic device 70 is a car stereo or the like installed in the vehicle interior, but the present disclosure is not limited thereto, and may be a video device including a display. Further, a smartphone or the like brought in from outside may be connected to the computer 60 and used.

The disclosure provides illustrative, non-limiting examples as follows:

According to a first aspect of the present disclosure, there is provided a seat including: a seat surface portion to be seated by a seated person and having a first support surface and a second support surface; and a switching mechanism by which the seat surface portion is configured to be brought down to a front side or brought up to a rear side by rotating rotation respect to a floor, wherein the seat surface portion is configured to be switched by the switching mechanism between: a first posture in which the seat surface portion is brought down to the front side such that the first support surface facing an upper side is in a low position where the seated person is capable of sitting thereon by lowering a hip and the second support surface facing the front side forms a lead-in surface which is led downward on the rear side, and a second posture in which the seat surface portion is brought up to the rear side from the first posture such that the second support surface is pulled up to a position higher than a position of the first support surface in the first posture, an upper surface of the second support surface is inclined downward to the front side due to the lead-in surface, and the second support surface is in a high position where the seated person in a standing posture is capable of sitting thereon, and wherein a vibration device which is configured to apply vibration corresponding to music to a body of the seated person is disposed at an inner side of the second support surface.

According to the first aspect, when the seated person is seated on the second support surface in the standing posture when the seat surface portion is in the second posture, the vibration corresponding to the music can be applied to the body of the seated person by the vibration device disposed at the inner side of the second support surface. Accordingly, the mood of the seated person can be enhanced.

According to a second aspect of the present disclosure, there is provided the seat according to the first aspect, wherein the vibration device includes a vibrating body and a rod-shaped body connected to the vibrating body, and wherein at least a part of the rod-shaped body is embedded in and attached to a cushion pad which is a cushion material disposed at the inner side of the second support surface.

According to the second aspect, the vibration corresponding to the music can be applied to the body of the seated person P from an embedded portion of the rod-shaped body through the cushion pad. As a result, by adjusting the shape of the rod-shaped body, the vibration corresponding to the music can be applied to the body of the seated person by simply disposing the rod-shaped body in a position where the seated person does not feel so uncomfortable.

According to a third aspect of the present disclosure, there is provided the seat according to the second aspect, wherein the at least a part of the rod-shaped body is embedded in and attached to a portion of the cushion pad which is disposed at the inner side of the second support surface and corresponds to a side portion of a thigh of the seated person seated on the second support surface in the standing posture.

According to the third aspect, the vibration corresponding to the music can be applied to the body of the seated person by simply disposing the rod-shaped body in a position where the seated person does not feel so uncomfortable.

According to a fourth aspect of the disclosure, there is provided the seat according to any one of the first to third aspects, wherein an acceleration sensor is disposed at the inner side of the second support surface, the acceleration sensor detects body motion of the seated person when the vibration corresponding to the music is applied to the body of the seated person by the vibration device, and the vibration is strengthened when the body motion is smaller than a predetermined value.

According to the fourth aspect, the body motion is generated when the mood of the seated person is enhanced due to the vibration corresponding to the music. When the body motion detected by the acceleration sensor is equal to or less than the predetermined value, the mood can be uplifted by strengthening the vibration.

What is claimed is:

1. A seat comprising:
   a seat surface portion to be seated by a seated person and having a first support surface and a second support surface; and
   a switching mechanism by which the seat surface portion is configured to be brought down to a front side of the seat or brought up to a rear side of the seat by rotating the seat surface portion with respect to a floor,
   wherein the seat surface portion is configured to be switched by the switching mechanism between:
      a first posture in which the seat surface portion is brought down to the front side of the seat such that the first support surface facing upward is in a low position where the seated person is capable of sitting on the first support surface by lowering a hip and the second support surface facing the front side of the seat forms a lead-in surface which is led downward on the rear side of the seat, and
      a second posture in which the seat surface portion is brought up to the rear side of the seat from the first posture such that the second support surface is pulled up to a position higher than a position of the first support surface in the first posture, an upper surface of the second support surface is inclined downward to the front side of the seat due to the lead-in surface, and the second support surface is in a high position where the seated person in a standing posture is capable of sitting on the second support surface,
   wherein a vibration device which is configured to apply vibration corresponding to music to a body of the seated person is disposed at an inner side of the second support surface, wherein the vibration corresponds to music, and
   wherein an acceleration sensor is disposed at the inner side of the second support surface, the acceleration sensor is configured to detect body motion of the seated person when the vibration corresponding to the music is applied to the body of the seated person by the vibration device, and the vibration is strengthened when the body motion is smaller than a predetermined value.

2. The seat according to claim 1,
   wherein the vibration device includes a vibrating body and a rod-shaped body connected to the vibrating body, and wherein at least a part of the rod-shaped body is embedded in and attached to a cushion pad which is a cushion material disposed at the inner side of the second support surface.

3. The seat according to claim 2,
wherein the at least a part of the rod-shaped body is embedded in and attached to a portion of the cushion pad which is disposed at the inner side of the second support surface and configured to correspond to a side portion of a thigh of the seated person seated on the second support surface in the standing posture.

* * * * *